April 14, 1953  G. E. HAUER  2,634,863
MECHANICALLY CLEANED SCREEN UNIT
Filed Dec. 7, 1949  3 Sheets-Sheet 1

INVENTOR.
Gerald E. Hauer
BY
Manus and Brown
Attys.

April 14, 1953

G. E. HAUER 2,634,863

MECHANICALLY CLEANED SCREEN UNIT

Filed Dec. 7, 1949

INVENTOR.
Gerald E. Hauer
BY
Mann and Brown
Attys

Patented Apr. 14, 1953

2,634,863

UNITED STATES PATENT OFFICE 2,634,863

MECHANICALLY CLEANED SCREEN UNIT

Gerald E. Hauer, Aurora, Ill., assignor to The American Well Works, a corporation of Illinois Application December 7, 1949, Serial No. 131,560

8 Claims. (Cl. 210—176)

Sewage and water treatment plants using mechanically cleaned screens in the flow channels heretofore have been confronted with the problem of securing the removal of all of the solids and debris accumulating in front of the screen. In these prior screen constructions, using a mechanical rake for cleaning the screen, the rake teeth have usually entered the flow channel in such a way as to leave a pocket of undisturbed screenings at the base of the screen.

The main objects of this invention, therefore, are to provide an improved form of mechanically cleaned screen unit for sewage and water treatment plants which removes all of the solids and debris accumulating in front of the screen; to provide an improved form and arrangement of removable bars for forming the screen; to provide an improved construction and operation of a rake for contacting the solids and debris at the bottom of the screen and conveying them along the screen to a point of disposal; to provide an improved screen rake construction and operation which gets under and lifts the screenings and which is self-cleaning at the point of discharging the screenings; to provide an improved arrangement of a receptacle for receiving the screenings raked from the screen; to provide improved means for maintaining an appropriate tension on the screen rake conveyor so as to insure the appropriate functioning of the rake at all times; and to provide an improved mechanically cleaned screen unit of this kind which, by reason of the simplicity of construction and arrangement of parts, is economical to manufacture and assemble into a compact unit, facile to position and anchor in place in a sewage or water flow channel, efficient in operation, and which permits quick replacement of parts broken or requiring repair.

Figure 1:
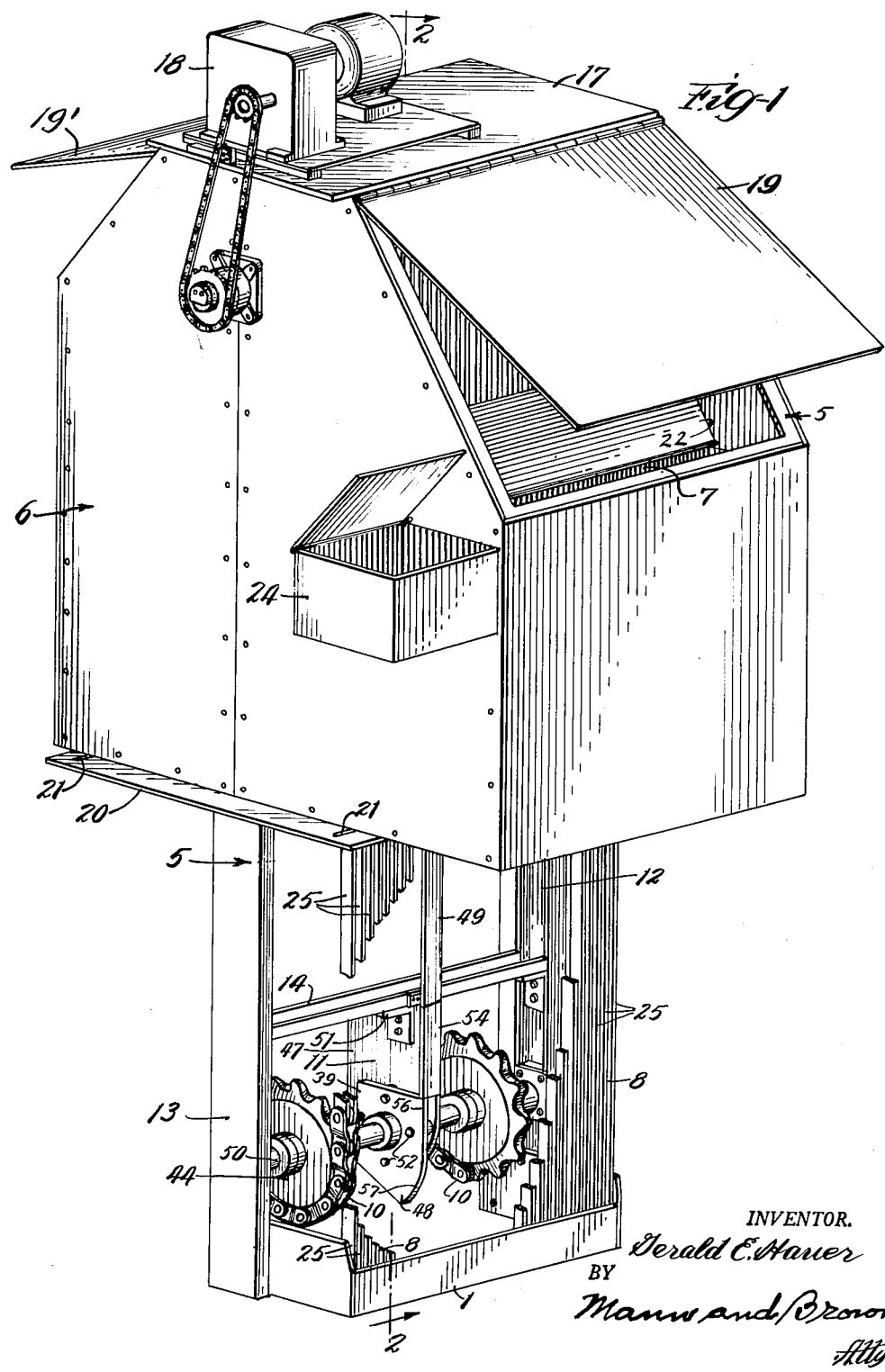
Fig. 1 is a perspective view of the unit, a part of the screen bars being broken away to more clearly illustrate the cam means by which the rake teeth are disposed and maintained horizontally transverse to the screen bars during the screen raking operation.

A mechanically cleaned screen unit constructed in accordance with this invention comprises a supporting frame 5 mounting a housing 6, wherein is arranged a collector 7 for screenings discharged from a screen 8 by a rake 9, hinged on a conveyor 10, and moved along the screen 8. The rake is actuated by cam means 11 so as to position the teeth of the rake 9 to protrude through the screen 8 and collect and lift solids and debris from the screen and discharge them into the collector 7, from whence they are delivered to a grinder or removable receptacle. All of these parts are simple in form and are compactly assembled into a unit which is convenient to handle and easy to position and anchor in a conventional concrete sewage or water-flow channel 12.

The supporting frame 5 comprises a pair of main channel standards 13 connected by crossbraces 14 and 15 and whereto is secured an angle bar framework providing pockets 16 and 16' for the screen 8, and to which plates are attached which form the housing 6 wherein is concealed the screenings-collector 7 and the upper part of the conveyor 10. The top of the housing serves as a platform 17 for mounting a motor-driven gear-reduction unit 18 connected to the conveyor 10. Hinged doors 19 and 19' permit examination of and access to the operating parts within the housing 6. Intermediate the ends of the uprights 13 and on opposite sides of the base of the housing 6 are secured flanges 20 (see Fig. 1) provided with slots 21, whereby the unit is supported on and anchored to the side walls of a concrete flow-channel 12.

The screenings collector 7 is a compartment partitioned off within the housing 6, and provided with a chute 22, hinged at 23, and normally urged by gravity to rest against the screen 8. This screenings compartment terminates in a box 24 (see Fig. 1), exterior of the housing 6. It is provided with an opening in the bottom thereof, and may have either a removable receptacle or a grinder attached thereto.

The screen 8 comprises a plurality of bars 25, the opposite ends of which are set in the pockets 16 and 16' and spaced apart horizontally by suitable fixed spacing blocks so as to provide a series of parallel spaces extending from top to bottom of the framework 5.

The rake 9 comprises a pair of separable bar parts 26 and 27, whereon are supported a plurality of teeth 28 and to which are attached pairs of hinge angles 29 and a cam roller bracket 30.

The lower rake bar part 26 is provided with a plurality of slots 31 wherein are seated the teeth 28. Along its upper face the bar part 26 is recessed to form a ridge 32 which fits in a recess 33 formed in the under face of the upper rake bar part 27.

Each of the teeth 28 is formed with a pair of lugs or shoulders 34 and 35, spaced apart to provide a recess 36 between them and wherein is seated the under portion of the upper rake bar part 27 when the parts 26 and 27 are assembled. When the teeth 28 are set in the slots 31 of the under rake bar part 26, the shoulders 34 register with the ledge 32. Thus, when the upper part 27 is secured in place by suitable screws the teeth 28 are rigidly held in place. The form of these slots 31, the recesses 36, and the interfitting parts 26 and 27 are such that the upper edges of the teeth 28 are pitched slightly rearwardly so that in operation the screenings will not fall off inadvertently. As will be apparent, this arrangement provides for an easy replacement of one or more teeth should they become damaged or broken.

Two pairs of hinge angles 29 are secured to the rake bar part 26 adjacent opposite ends thereof and receive pins 37 by which the rake is hingedly connected to flanges 38 on links 39 of the conveyor 10.

The cam roller bracket 30 is in the form of a T, with the stem somewhat Y-shaped. The transverse part of the bracket 30 is secured to the rake bar part 26, by suitable screws, intermediate the pairs of hinge angles 29. Cam rollers 40 and 41 are journaled on shoulder pins 42 at the end of the Y-shaped stem of the bracket 30. As will be most clearly noted from Fig. 4, the rollers 40 and 41 are mounted on opposite sides of the stem part of the bracket 30 and are spaced apart transversely of their parallel axes, i. e., in the line of their travel.

Figure 4:
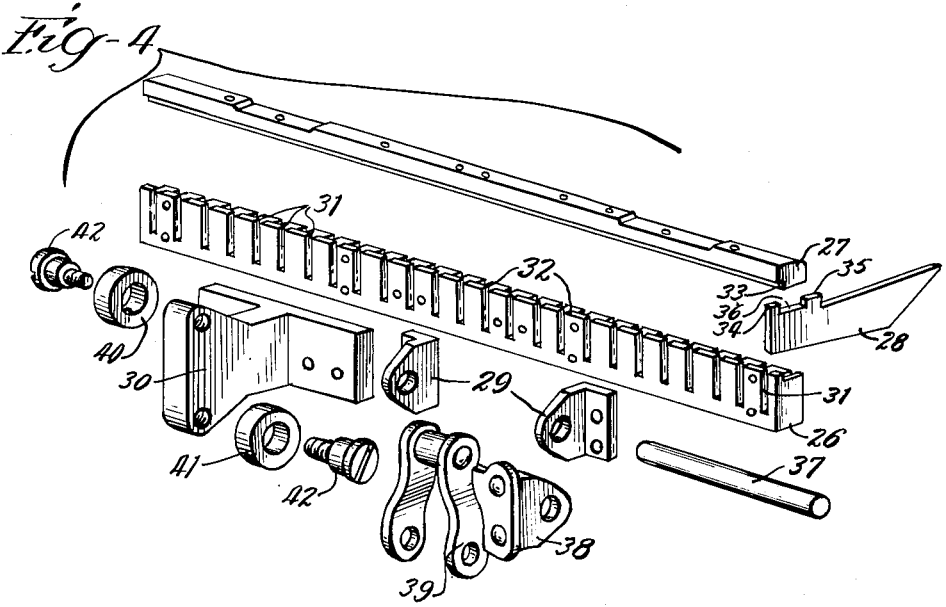
Fig. 4 is an exploded view showing parts of the rake bar, teeth, and the hinge and cam rollers by which the bar is connected to the conveyor and the teeth positioned and held transverse to the screen.

The conveyor 10 comprises a pair of conventional link belts 43, one link in each of which is the flange link 39 shown in Fig. 4, and whereto is hinged the rake 9. The belts 43 run over the usual sprockets 44 journaled on the channel standards 13 adjacent the upper and lower ends thereof. Idlers 45, journaled on brackets 46 slidably supported to the cross-brace 15, are shiftable so as to maintain the appropriate tension on the link belts 43. Thus positioned, the conveyor 10 traverses a path adjacent and parallel to the screen 8, and a path distant from the screen 8 and slightly out of parallel with the adjacent path by reason of the positioning of the idlers 45.

Figure 2:
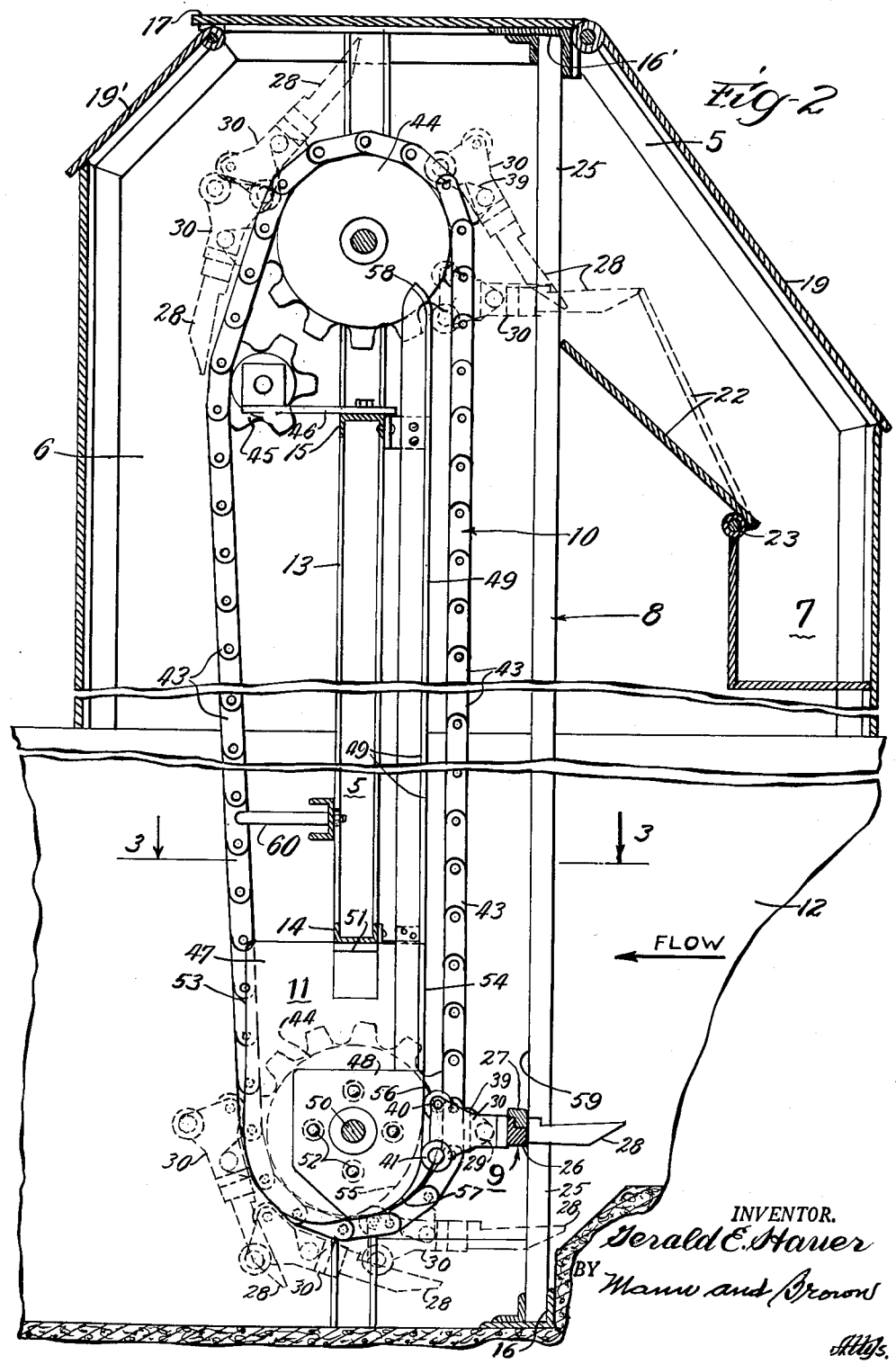
Fig. 2 is a vertical, sectional elevation of the same as viewed from the plane of the line 2—2 of Fig. 1.
Figure 3:
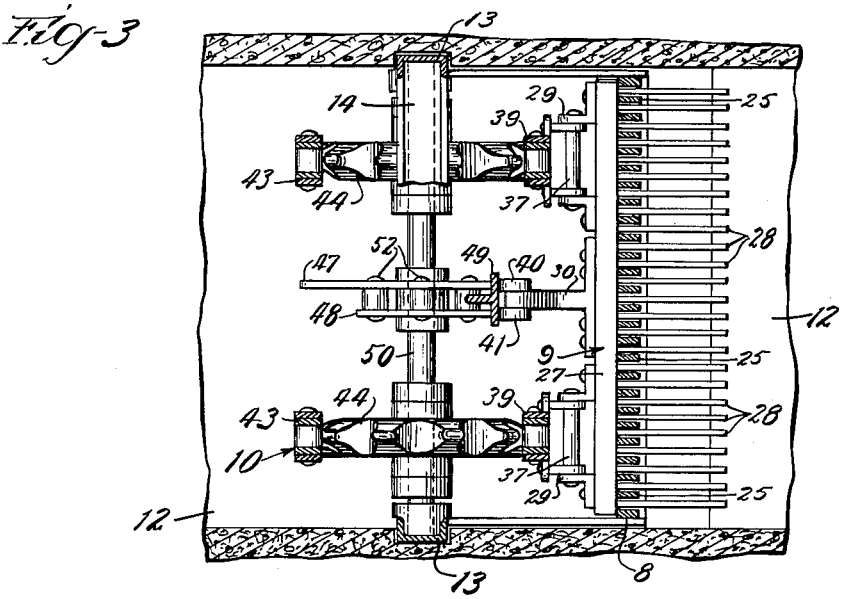
Fig. 3 is a transverse, sectional view taken on the line 3—3 of Fig. 2.

By reason of the hinged connection of the rake 9 to the link 39 of the conveyor belts 43, the weight of the rake bar and teeth 28 normally urges the teeth into a retracted position against the conveyor links, as most clearly indicated in Fig. 2, when the cam rollers 40 and 41 are disengaged from the cam means 11.

The cam means 11 comprises a pair of cam plates 47 and 48 and a cam track rail 49. The cam plates 47 and 48 are mounted on the shaft 50 for the lower conveyor sprockets 44. The plate 47 is also anchored as shown at 51 (see Fig. 1) to the cross-bar 14, and has the plate 48 secured thereto in spaced relationship by screws 52, suitable spacers being inserted between the two plates.

The cam plate 47 has the opposite parallel cam surfaces 53 and 54 disposed parallel with the screen 8 and the adjacent path of the conveyor 10. These surfaces 53 and 54 are connected by an arcuate section 55, contiguous to but partially concentric and partially eccentric with the periphery of the lower conveyor sprockets 44.

The cam plate 48 has a cam surface 56 along one edge disposed in the plane of the corresponding edge 54 of the cam plate 47, and with the lower edge thereof of arcuate form, as shown at 57, on an axis much greater than that of the arcuate surface 55 of the cam plate 47.

The spacing of the cam plates 47 and 48 axially of the shaft 50 is such that the cam roller 40 contacts and traverses the cam surfaces 53, 55 and 54 of the cam plate 47, whereas the roller 41 contacts and traverses the cam surfaces 57 and 56 of the cam plate 47.

These cam plates 47 and 48 coact with the respective rollers 40 and 41 on the rake 9, so that as the rake moves around the crown of the lower conveyor sprockets 44 and starts the ascent toward and along the screen the teeth 28 are disposed and firmly held in a horizontal position relative to the screen 8 (see Fig. 2).

The cam track rail 49 is a T shape and constitutes a continuation of the cam surfaces 54 and 56 of the cams 47 and 48. This rail 49 is anchored to the cross-braces 14 and 15 and terminates at 58 at a point adjacent the upper end of the chute 22 to the screenings receptacle 7 and near the upper sprockets 44. The rail 49 is engaged by both rollers 40 and 41, after leaving the cam plates 47 and 48, and serves to maintain the rake teeth 28 horizontal throughout their travel along the screen 8.

The primary function of the roller 41, contacting the cam plate 48 and the cam rail 49, is to ensure the rake bar being held with the teeth 28 horizontal, and the face of the rake bar, opposed to the screen bars 25, always maintained parallel to said screen bars so as to prevent the rake bar from binding against the face 59 of the screen bars by reason of the load of screenings on the teeth 28.

In order to insure a reversal of the rake 9, if perchance gravity does not effect such reversal after the rake 9 has begun its descent following its passage over the upper sprockets 44, a safety trip 60 is mounted on the channel bars 13 above the cross-bars 14. It is positioned to engage the roller 41 and turn the rake through an angle of substantially 180 degrees before it reaches a position for the roller 40 to contact the cam plate 47.

The operation of this improved mechanically cleaned screen unit is as follows: After the rake 9 has dumped an accumulation of screenings onto the chute 22, for discharge into the collector 7, and moves over the crown of the upper conveyor sprockets 44, the weight of the bar and teeth of the rake 9 causes it to flop over, as indicated at the upper lefthand corner of Fig. 2, so that the teeth 28 are advancing with the conveyor belts 43 rather than trailing.

As the rake 9 approaches the cam plate 47 the roller 40 engages the cam surface 53. As the rake continues its movement downwardly the bar of the rake is held in the same close contact with the links of the conveyor belts 43 as it assumed after being tipped over for disposing the teeth in an advancing position. As the rake moves around the crown of the lower conveyor sprockets 44 the roller 40, contacting the eccentric part of the arcuate section 55 of the cam plate 47, permits the rake bar to swing on its pivot so as to dispose the teeth 28 in a horizontal position.

Thus, as the ends of the teeth enter the spaces in the screen 8, they come into contact with and initiate the pickup of the solids and debris accumulating in front of the screen 8 (Fig. 2) in the very bottom of the channel 12.

As the rake 9 continues its ascent and approaches the path of the conveyor parallel and adjacent to the screen 8, the roller 41 comes into contact with the arcuate section 57 of the cam plate 48, whereupon the horizontal disposition of the teeth 28 is firmly maintained. This firm horizontal disposition of the teeth 28 continues throughout the length of the cam track 49 with which both of the rollers 40 and 41 maintain their contact after passing out of contact with the surfaces 54 and 56, respectively.

As the rake 9 approaches the upper end of the screen 8, with an accumulation of screenings on the teeth 28 protruding through the spaces in the screen 8, the teeth contact the chute 22 and retract it from the full line to the dotted line position, shown in Fig. 2. At the instant the the roller 41 passes the end 58 of the cam track rail 49, the weight of the bar and teeth of the rake 9 causes the rake to suddenly drop, releasing the chute 22 and withdrawing the teeth through the spaces of the screen 8. The result is a complete cleaning of the screenings from the rake teeth and their descent into the collector 7, from whence they are discharged into the box 24 and the removable receptacle or grinder (not shown) attached to said box.

In the event the rake 9 should not flop over, as indicated in the upper lefthand corner of Fig. 1, and should continue its descent along the distant path of the conveyor with the teeth trailing rather than advancing, the safety trip 60 will engage the roller 41 in time to swing the rake 9 approximately 180 degrees so that the roller 40 will come into contact with the cam surface 53 on the cam plate 47 to effect the disposition of the rake 9 with regard to the conveyor, as hereinbefore explained.

It should be noted that the entire unit may be quickly and easily installed by dropping the entire unit into vertical grooves formed in the sides of the flow-channel, whereupon the unit is secured in place by suitable securing means passed through the slots 21 of the flanges 20.

Obviously, the invention may variously be embodied within the scope of the appended claims.

I claim:

1. In a mechanically cleaned screen unit of the class described, the combination of a supporting frame, a substantially vertical screen formed of vertical parallel bars spaced apart to provide a plurality of longitudinally disposed parallel spaces, a link belt conveyor mounted on sprockets on the downstream side of the screen and adapted to traverse adjacent and distant paths longitudinally of said screen, means for driving the conveyor in a direction that causes the conveyor to move upwardly along said adjacent path and downwardly along said distant path, a rake pivotally carried on said conveyor and having a plurality of teeth adapted to travel in said parallel spaces in the screen, and coacting means on said frame and rake including a cam and follower, adapted to dispose and hold said teeth substantially at right angles to said screen as they enter the lower end of the screen and start to project through said screen spaces and while said teeth are traversing the conveyor path adjacent said screen, whereby said teeth collect and move the accumulations along said screen to a point of discharge adjacent the upper end thereof.

2. In a mechanically cleaned screen unit of the class described, the combination of a frame, a plurality of spaced substantially vertical parallel bars forming a screen, a link belt conveyor mounted on sprockets on the downstream side of the screen and adapted to traverse adjacent and distant paths longitudinally of said screen, means for driving the conveyor in a direction that causes the conveyor to move upwardly along said adjacent path and downwardly along said distant path, a rake bar mounting a plurality of teeth and hinged to said conveyor, and coacting cam means on said frame and rake bar adapted to contact said rake bar as it approaches the conveyor path adjacent said screen and dispose and hold said teeth substantially at right angles to said screen as they enter the lower end of the screen and start to project through said screen spaces and while said teeth are traversing the conveyor path adjacent said screen, whereby said teeth collect and move the accumulations along the screen bars to a point of discharge adjacent the upper end thereof, said cam means being shaped to withdraw support for said extended teeth when adjacent said point of discharge, whereby the accumulations are dumped forwardly of the screen bars.

3. In a mechanically cleaned screen unit of the class described, the combination of a frame, a plurality of spaced substantially vertical parallel bars forming a screen, a link belt conveyor mounted on sprockets journaled adjacent opposite ends of said bars and rearwardly thereof to traverse adjacent and distant paths longitudinally of said screen, means for driving the conveyor in a direction that causes the conveyor to move upwardly along said adjacent path and downwardly along said distant path, a rake bar mounting a plurality of teeth and hinged to said conveyor so that the weight of said rake bar and teeth normally retracts said teeth against said conveyor when said teeth are traversing the conveyor path distant from said screen, a cam track on said frame having portions disposed substantially parallel to said adjacent conveyor path and an arcuate portion contiguous to the periphery of the lower of said sprockets, and cam track follower means on said rake bar coacting with said cam track to dispose and hold said teeth substantially at right angles to said screen from the time said rake bar passes the crown of said lower sprocket to the approach of said rake bar to the other said sprocket whereby said teeth enter the bottom of said screen spaces in carrying position so as to collect and move the accumulations along said bars to a point of discharge adjacent the upper end of said screen, said cam track being shaped to withdraw support for said extended teeth when adjacent said point of discharge whereby the accumulations are dumped forwardly of the screen bars.

4. In a mechanically cleaned screen unit of the class described, a combination of a supporting frame, a plurality of spaced substantially vertical parallel bars forming a screen, a conveyor comprising a pair of spaced link belts traveling over sprockets journaled adjacent opposite ends of said bars and rearwardly thereof to traverse adjacent and distant paths longitudinally of said screen, means for driving the conveyor in a direction that causes the conveyor to move upwardly along said adjacent path and downwardly along said distant path, a rake bar mounting a plurality of teeth hinged to said link belts, a pair of cam plates arranged between said link belts adjacent the lower of said sprockets, one of said cam plates having its opposite edges disposed parallel to the adjacent path of said link belts and joined at their lower ends by an arcuate portion contiguous to the periphery of said lower sprockets, the other cam plate having the edge thereof adjacent said screen bars disposed in the plane of the corresponding edge of said first-mentioned cam plate and having the lower end curved downwardly and rearwardly on an axis greater than the peripheries of said lower sprockets, a pair of cam rollers journaled on said rake bar and spaced apart axially and in their line of travel so as to respectively contact said cam plates and dispose said teeth substantially at right angles to said screen from the time said rake bar passes the crown of said lower sprockets whereby said teeth enter the bottom of said screen spaces transversely disposed, and a cam track rail mounted on said frame above said cam plates to form an extension of the edges thereof contiguous to said screen, said rail engaging said cam rollers to maintain said teeth substantially at right angles to said screen during the movement therealong to a point adjacent said upper sprockets.

5. In a mechanically cleaned screen unit of the class described, the combination of a frame, a plurality of spaced substantially vertical parallel bars forming a screen, a link belt conveyor mounted on sprockets on the downstream side of the screen and adapted to traverse adjacent and distant paths longitudinally of said screen, means for driving the conveyor in a direction that causes the conveyor to move upwardly along said adjacent path and downwardly along said distant path, a rake bar mounting a plurality of teeth and hinged to said conveyor so that the weight of said teeth and rake bar normally retracts said teeth and points them downwardly when said teeth are traversing the conveyor path distant from said screen, cam means at the bottom of the frame coacting with the rake bar to feed the rake bar teeth into the screen while held in a position substantially at right angles to said screen, and means on said frame positioned to contact said rake bar as it approaches said cam means and swing said rake bar to dispose said teeth from a trailing to an advancing relationship with respect to the direction of travel of said conveyor in the event that the rake bar is approaching said cam means with the teeth in trailing relationship.

6. In a mechanically cleaned screen unit of the class described, a combination of a supporting frame, a plurality of spaced substantially vertical parallel bars forming a screen, a pair of spaced link belts traveling over sprockets journaled adjacent opposite ends of said bars and rearwardly thereof to traverse adjacent and distant paths longitudinally of said screen, means for driving the conveyor in a direction that causes the conveyor to move upwardly along said adjacent path and downwardly along said distant path, a rake bar mounting a plurality of teeth hinged to said link belts, a pair of cam plates arranged between said link belts adjacent the lower of said sprockets, one of said cam plates having its opposite edges disposed parallel to the adjacent path of said link belts and joined at their lower ends by an arcuate portion contiguous to the periphery of said lower sprockets, the other cam plate having the edge thereof adjacent said screen bars disposed in the plane of the corresponding edge of said first-mentioned cam plate and having the lower end curved downwardly and rearwardly on an axis greater than the peripheries of said lower sprockets, a pair of cam rollers journaled on said rake bar and spaced apart axially and in their line of travel so as to respectively contact said cam plates and dispose said teeth substantially at right angles to said screen from the time said rake bar passes the crown of said lower sprockets whereby said teeth enter the bottom of said screen spaces transversely disposed, a cam track rail mounted on said frame above said cam plates to form an extension of the edges thereof contiguous to said screen, said rail engaging said cam rollers to maintain said teeth transverse to said screen during the movement therealong to a point of discharge adjacent said upper sprockets, and a tripper arm on said frame positioned to engage one of said cam rollers as they approach said cam plates and swing said rake bar to dispose said teeth from a trailing to an advancing relationship with respect to the direction of travel of said link belts in the event that the rake bar is approaching said cam means with the teeth in trailing relationship.

7. In a mechanically cleaned screen unit of the class described, the combination of a supporting frame, a substantially vertical screen having a plurality of longitudinally disposed parallel spaces, a screening-receiving compartment adjacent to and forwardly of the upper end of said screen, a chute for directing screenings into said compartment hinged on said frame and normally urged into an inclined position with its upper end resting against the forward face of said screen, a link belt conveyor mounted on sprockets rearwardly of the screen and adapted to traverse adjacent and distant paths longitudinally of said screen, means for driving the conveyor in a direction that causes the conveyor to move upwardly along said adjacent path and downwardly along said distant path, a rake bar mounting a plurality of teeth hinged to said conveyor, cam means on said frame and rake bar for holding said teeth substantially at right angles to said screen as they start to project through said screen spaces and while said teeth are traversing said conveyor path adjacent said screen whereby said teeth collect and move the screenings upwardly along said screen to a point of discharge above said chute, said cam means being shaped to withdraw support for said extended teeth when said teeth reach said point of discharge and immediately after the teeth have moved past the chute causing it to swing about its pivot and then fall by gravity to its normal inclined position resting against the screen.

8. In a mechanically cleaned screen unit of the class described, the combination of a main frame comprising a pair of spaced vertical standards spanned by vertically spaced cross-braces and mounting at opposite ends nested angle bars spaced horizontally from said standards to form opposed channel pockets at the opposite ends of said standards, a plurality of substantially vertical bars having their opposite ends seated in said pockets and spaced horizontally to form a screen, conveyor sprockets journaled adjacent the opposite ends of standards on the rearward side of said screen, conveyor link belts extending around said sprockets and adapted to traverse adjacent and distant paths longitudinally of said screen, means for driving the conveyor in a direction that causes the conveyor to move upwardly along said adjacent path and downwardly along said distant path, a rake bar mounting a plurality of teeth hingedly connected to a link in each of said belts so that the weight of said rake bar and teeth normally retracts said teeth against said link belts when said teeth are traversing the conveyor path distant from said screen, a cam track on said frame having portions disposed substantially parallel to said adjacent conveyor path and an arcuate portion contiguous to the periphery of the lower of said sprockets, cam track follower means on said rake bar coacting with said cam track to dispose and hold said teeth transverse to said screen from the time said rake bar passes the crown of said lower sprocket to the approach of said rake bar to the other said sprocket whereby said teeth enter the bottom of said screen spaces substantially at right angles to said screen so as to collect and move said accumulations along said bars to a point of discharge, a housing mounted on said standards and enclosing the upper portion of said screen and conveyor and providing a receptacle for the screenings discharged from said rake teeth, and horizontally disposed flanges secured to said standards at the base of said housing and adapted to support said unit on the side walls of a flow channel with the portions of said standards below said flanges suspended in said flow channel.

GERALD E. HAUER.

References Cited in the file of this patent

UNITED STATES PATENTS

| Number | Name | Date |
|---|---|---|
| 170,405 | Sedgwick | Nov. 23, 1875 |
| 639,850 | Hahn | Dec. 26, 1899 |
| 1,799,457 | Cuttle et al. | Apr. 7, 1931 |
| 2,379,615 | Walker | July 3, 1945 |

FOREIGN PATENTS

| Number | Country | Date |
|---|---|---|
| 212,048 | Germany | May 28, 1908 |